(12) United States Patent
Yamazaki

(10) Patent No.: US 7,388,719 B2
(45) Date of Patent: Jun. 17, 2008

(54) CAMERA SYSTEM

(75) Inventor: Shoichi Yamazaki, Yokohama (JP)

(73) Assignee: Canon Kabushiki Kaisha, Tokyo (JP)

( * ) Notice: Subject to any disclaimer, the term of this patent is extended or adjusted under 35 U.S.C. 154(b) by 0 days.

(21) Appl. No.: 11/685,417

(22) Filed: Mar. 13, 2007

(65) Prior Publication Data
US 2007/0229978 A1 Oct. 4, 2007

(30) Foreign Application Priority Data
Mar. 29, 2006 (JP) ............... 2006-090807

(51) Int. Cl.
*G02B 15/14* (2006.01)
(52) U.S. Cl. .................... 359/694; 359/740
(58) Field of Classification Search ............ 359/694, 359/695, 696, 699, 689, 690, 691, 692
See application file for complete search history.

(56) References Cited

U.S. PATENT DOCUMENTS 5,937,212 A  8/1999 Kurahashi et al.
5,974,272 A * 10/1999 Kiesow et al. .......... 396/140

FOREIGN PATENT DOCUMENTS

JP  10-145649  5/1998

* cited by examiner

Primary Examiner—Timothy J Thompson
(74) Attorney, Agent, or Firm—Morgan & Finnegan LLP

(57) ABSTRACT

Disclosed is a camera system equipped with a pair of photographing systems and a drive mechanism. Each of the pair of photographing systems of the camera system is equipped with an image pickup element and a zoom lens for forming an object image on the image pickup element. The entrance pupil position of this zoom lens with respect to the image pickup element varies according to zooming. When zooming is performed, the drive mechanism moves the zoom lenses and the image pickup elements integrally in a direction opposite to a direction in which the entrance pupil positions of the zoom lenses move with respect to the image pickup elements. Further, each of the pair of photographing systems is configured to be rotatable around the entrance pupil centers of the respective zoom lenses of the photographing systems.

3 Claims, 5 Drawing Sheets

W (WIDE-ANGLE END)

T (TELEPHOTO END)

CAMERA SYSTEM

BACKGROUND OF THE INVENTION

1. Field of the Invention

The present invention relates to a camera system. The camera system of the present invention is applicable, for example, to a three-dimensional camera for monitoring, a built-in three-dimensional camera in a video see-through head mounted display (HMD), and a three-dimensional camera to be used as a robot eye.

2. Description of the Related Art

When obtaining a parallax image by using multiple photographing systems, if the entrance pupil position of each photographing system varies depending on the object distance or the zoom position, it is impossible to obtain a satisfactory parallax image for three-dimensional viewing.

In view of this, according to Japanese Patent Application Laid-Open No. H10-145649 (which corresponds to U.S. Pat. No. 5,937,212), in order to obtain an accurate parallax image, the entrance pupil is arranged at the position in the zoom lens nearest to the object, that is, the aperture stop is arranged on the front side of the zoom lens, thereby preventing variation in the entrance pupil position due to zooming. Further, according to Japanese Patent Application Laid-Open No. H10-145649, right-hand and left-hand photographing systems are configured so as to be rotatable around the respective entrance pupil center positions of the photographing system. Thus, when zooming or adjusting the angle of convergence, there is no need to correct variation in the entrance pupil positions of the photographing systems.

However, when the aperture stop is arranged at the position in the zoom lens nearest to the object as in Japanese Patent Application Laid-Open No. H10-145649, the size of the zoom lens becomes rather large.

SUMMARY OF THE INVENTION

It is an object of the present invention to provide a camera system which not only helps to obtain a satisfactory parallax image for three-dimensional viewing but also realizes a reduction in size.

According to an exemplary embodiment of the present invention, a camera system includes a pair of photographing systems and a drive mechanism. Each of the pair of photographing systems includes an image pickup element and a zoom lens for forming an object image on the image pickup element. The entrance pupil position of this zoom lens with respect to the image pickup element varies according to zooming. When zooming, the drive mechanism moves the zoom lenses and the image pickup elements integrally in a direction opposite to the direction in which the entrance pupil positions of the zoom lenses move with respect to the image pickup elements. Further, each of the pair of photographing systems is rotatable around the entrance pupil centers of the respective zoom lenses of the photographing systems.

Further features of the present invention will become apparent from the following description of exemplary embodiments with reference to the attached drawings.

DESCRIPTION OF THE EMBODIMENTS

While the camera system of the present invention allows use of multiple photographing systems, the following exemplary embodiment described below uses, for the sake of convenience in illustration, a pair of right and left photographing systems.

In the camera system of this exemplary embodiment, the right and left zoom lenses, which are arranged at a fixed base length interval, can be rotated around the respective entrance pupil centers toward the object. Variation in the entrance pupil position of each zoom lens due to zooming is mitigated or corrected (hereinafter referred to as "correction") through movement of the entire zoom lens and the image pickup element. That is, the entrance pupil positions of the right and left photographing systems are spatially fixed, and the distance between the entrance pupil centers of the right and left photographing systems is always kept equal to the base length interval irrespective of the zoom position. As a result, it is possible to obtain a satisfactory parallax image independently of the zoom position or the angle of convergence.

The pair of right and left zoom lenses perform the zooming action through movement in the optical axis direction of multiple lens units. To correct variation in the entrance pupil positions with respect to the image pickup elements, depending on the zoom position, the image pickup elements and the zoom lenses are moved integrally by the same amount along the respective optical axes. As a result, the respective entrance pupil positions of the zoom lenses are spatially fixed. In moving the image pickup elements and the zoom lenses integrally, the entire lens barrels are moved.

In performing zooming, the movable lens units constituting the zoom lenses move by using mechanical zoom cams on the lens barrels. Alternatively, it is possible to move the movable lens units through drive control by actuators (hereinafter referred to as "electronic cams"), using positional data on the movable lens units according to the focal length of the entire systems. The correction of variation in the entrance pupil positions due to zooming can be effected by using mechanical pupil cams provided on the same lens barrels as the zoom cams or on different lens barrels. Alternatively, it is also possible to perform drive control by actuators, using entrance pupil position correction data according to the focal length. By thus using mechanical cams or electronic cams, variation in the entrance pupil positions due to zooming is mitigated.

When correcting variation in the entrance pupil positions due to zooming, the image pickup elements and the zoom lenses are moved as integral units, that is, the entire lens barrels are moved, so it is desirable to use electronic cams and perform driving by using stepping motors, since the driving helps to obtain a torque of high precision.

Next, a camera system according to an exemplary embodiment of the present invention will be described with reference to the drawings.

Figure 1:
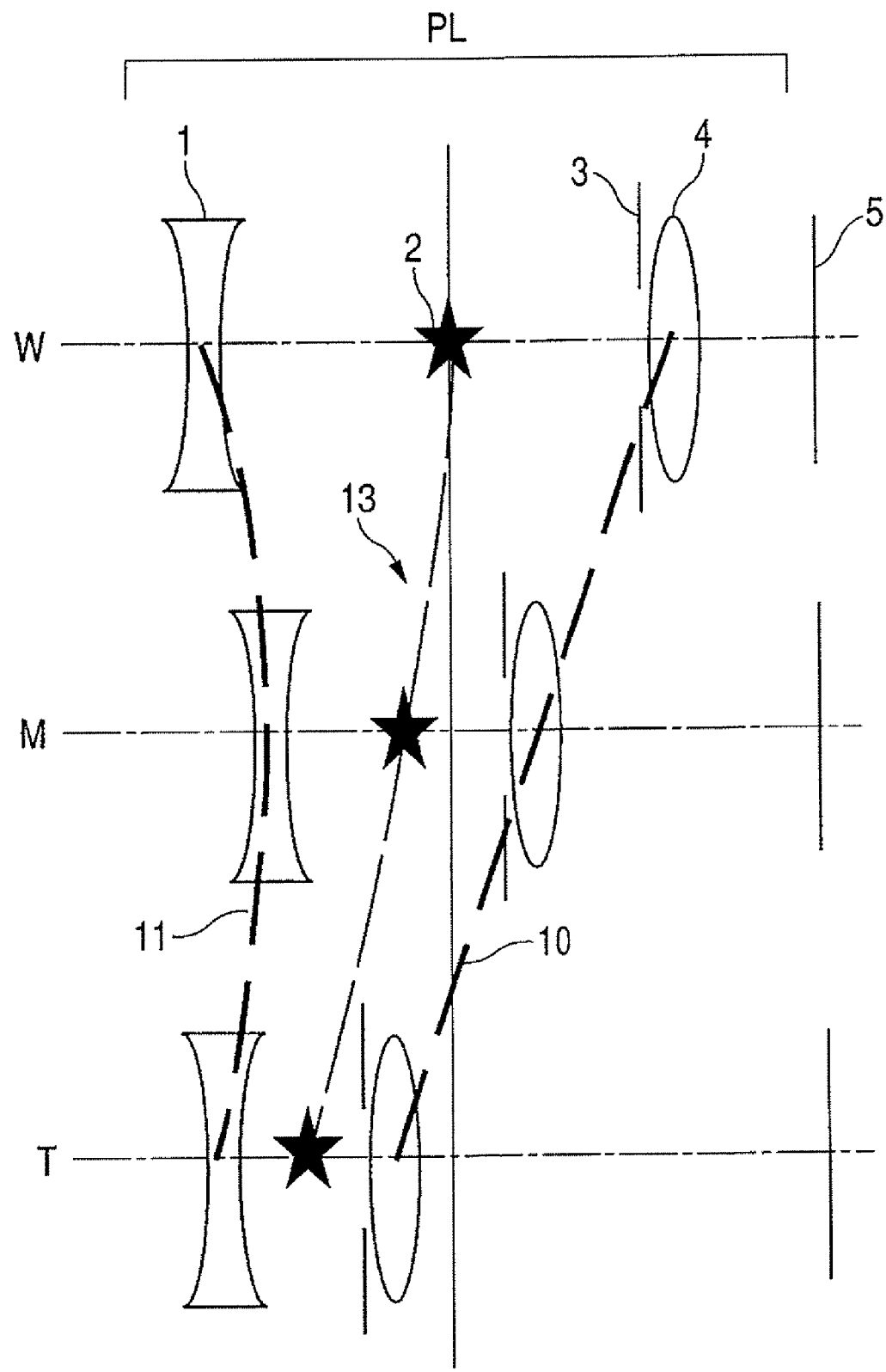
FIG. 1 is an explanatory view illustrating how the entrance pupil position of a zoom lens varies.

FIG. 1 is a schematic diagram illustrating how members of a zoom lens PL move upon zooming. The zoom lens PL constitutes a part of a pair of photographic systems included in a camera system. In FIG. 1, W represents a wide-angle end (small focal length end), M represents an intermediate zoom position, and T represents a telephoto end (large focal length end). In FIG. 1, the left-hand side is the object side, and the right-hand side is the image side.

In FIG. 1, a first lens unit 1 has negative refractive power (optical power=the reciprocal of the focal length), and a second lens unit 4 has positive refractive power. An aperture stop 3 is disposed on the object side of the second lens unit 4; and 5 represents a solid-state image pickup element (photoelectric transducer) such as a CCD sensor or a CMOS sensor.

In zooming from the wide-angle end W to the telephoto end T, the first lens unit 1 moves along a part of a locus convex to the image side as indicated by a curve 11. The second lens unit 4 moves toward the object side along a movement locus as indicated by a straight line 10. In zooming, both lens units are moved, with the result that the distance between the two lens units is changed. The aperture stop 3 moves together with the lens unit 4 during zooming.

In the zoom lens PL of this exemplary embodiment, the variable magnification is mainly effected by the movement of the second lens unit 4, and the movement of the image plane due to the variable magnification is compensated for through the movement of the first lens unit 1.

A star-shaped mark indicated by reference numeral 2 represents the position of the image of the aperture stop 3 (entrance pupil position) visible through the first lens unit 1. A curve 13 represents the movement locus of the entrance pupil position 2 due to zooming. The curve 13 corresponds to the variation of the entrance pupil position (change in position with respect to the image pickup element 5) due to zooming.

The zoom lens PL of FIG. 1 has only been illustrated by way of example. The zoom lens of the camera system of the present invention is not restricted to the zoom type as illustrated in FIG. 1; it is also possible to adopt a zoom lens of some other type as long as it is a zoom lens in which the entrance pupil position with respect to the image pickup element varies as a result of zooming.

Figure 2:
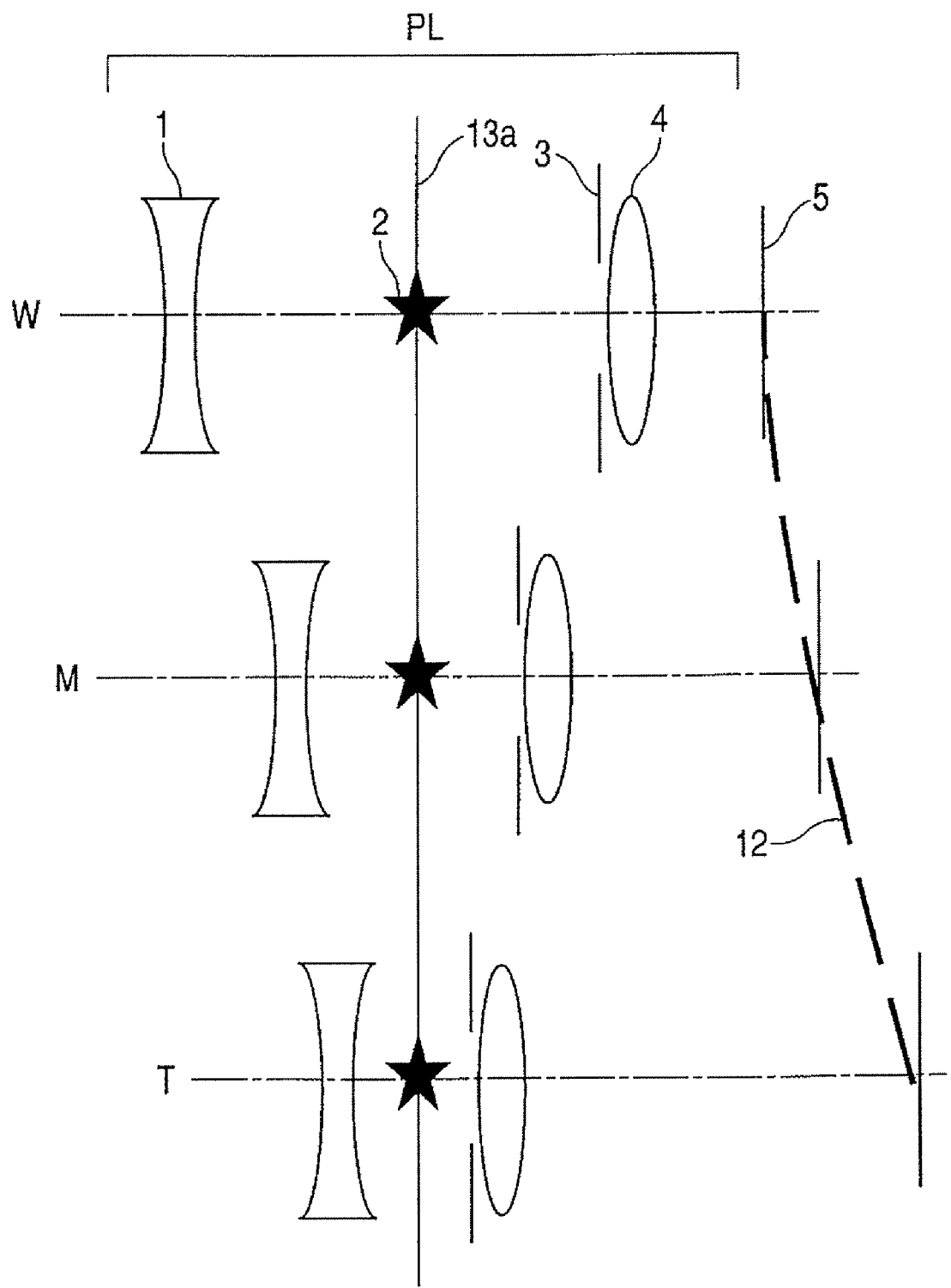
FIG. 2 is an explanatory view illustrating how variation in the entrance pupil position of the zoom lens is corrected.

FIG. 2 is an explanatory view illustrating how variation in the entrance pupil position due to zooming is corrected.

In FIG. 2, a line 13a represents a locus of the entrance pupil position 2 after the correction of the variation in the entrance pupil position 2. The entire zoom lens PL and the image pickup element 5 are moved integrally in the optical axis direction such that the locus 13a remains at a fixed position in the optical axis direction, that is, the entrance pupil position 2 is spatially fixed. A curve 12 represents the movement locus of the integral movement of the entire zoom lens PL and the image pickup element 5. The movement locus 12 and the locus 13 of the variation in the entrance pupil position in FIG. 1 are in reflection symmetry. That is, in zooming, the zoom lens PL and the image pickup element 5 are moved in a direction opposite to the direction in which the entrance pupil position 2 is moved with respect to the image pickup element 5.

The movement locus 12 corresponds to the movement locus of the image pickup element 5 in the space.

In both FIGS. 1 and 2, the object distance is a certain, fixed distance. When a focus lens unit (not illustrated) is positioned on the image side of the aperture stop 3, the entrance pupil position 2 does not vary even if the focus lens unit is moved for focusing in an arbitrary zoom position. Thus, the locus 13 and the locus 12 undergo no change depending upon the position of the focus lens unit (that is, object distance). When the focus lens unit is positioned on the object side of the aperture stop 3, the entrance pupil position is changed somewhat if the focus lens unit moves in each zoom position. Thus, the locus 13 and the locus 12 are changed to some degree depending upon the position of the focus lens unit.

However, since the loci 13 and 12 are not changed to an extreme degree, it is substantially possible to achieve the object of the present invention without having to take the change into consideration. A complete correction of the variation in the entrance pupil position is possible, for example, by preparing an entrance pupil position variation correction data table according to the focal length of the entire system and the position of the focus lens units, and moving the zoom lenses PL and the image pickup elements 5 integrally in their respective optical axis directions for correction by the same amount on the right and left sides according to the data table. It is also possible to effect the correction by using a mechanical cam. That is, a focus cam is provided in addition to a zoom cam and an entrance pupil position correction cam. In another method using a mechanical cam, in addition to the zoom cam and the entrance pupil position correction cam, a cam for canceling a deviation in entrance pupil position due to focusing can be provided on the lens barrel.

Figure 3A:
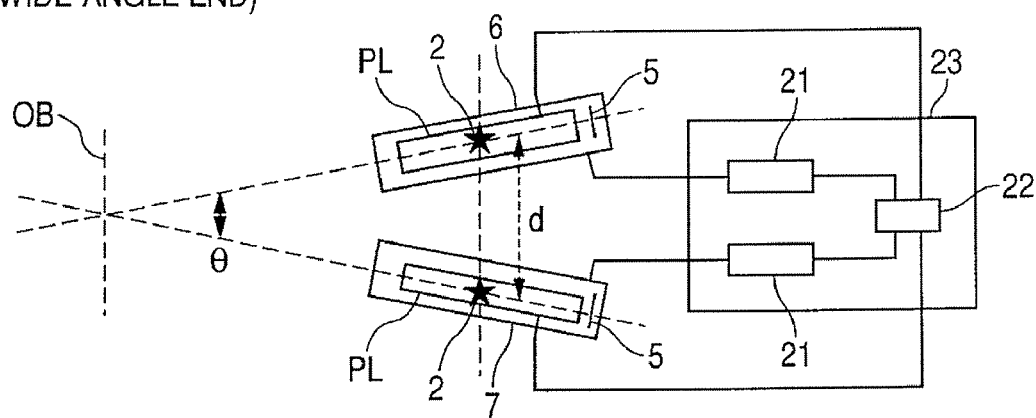
FIGS. 3A and 3B are top plan views of a camera system.
Figure 3B:
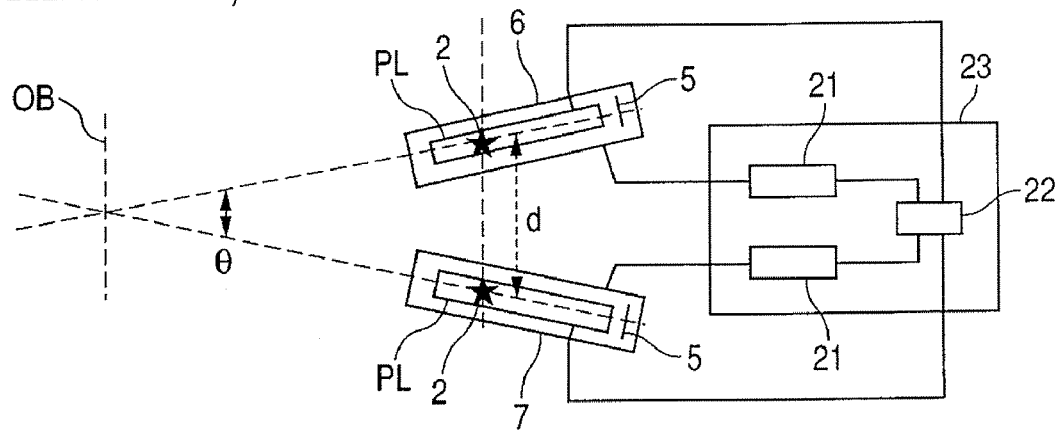

FIGS. 3A and 3B are schematic views of a camera system according to this exemplary embodiment, respectively illustrating the camera system at the wide-angle end and the telephoto end. In this exemplary embodiment described below, variation in the entrance pupil position is corrected by using an electronic cam.

In FIGS. 3A and 3B, the components indicated by the same reference numerals as those in FIGS. 1 and 2 are of the same function, so a description thereof will be omitted. In FIGS. 3A and 3B, a photographing system 6 for the right eye and a photographing system 7 for the left eye, each of which includes the zoom lens PL and the image pickup element 5. A drive mechanism 23 includes an actuator 21 and a computing unit 22. The computing unit 22 stores information corresponding to the locus 12 of FIG. 2 (electronic cam). The actuators 21 drive the zoom lenses PL and the image pickup elements 5 integrally in the optical axis directions based on a signal from the computing unit 22. The computing unit 22 computes the entrance pupil positions, which vary with the zooming of the zoom lenses PL, and transmits a drive signal to the actuators 21. In this way, the drive mechanism 23 moves the zoom lenses PL and the image pickup elements 5 integrally during zooming in a direction opposite to the direction in which the entrance pupil positions move with respect to the image pickup elements 5, effecting control such that the spatial positions of the entrance pupils of the zoom lenses PL do not vary with zooming.

In FIGS. 3A and 3B, an object OB is situated at the center of the camera system. In the camera system, the photographing systems 6 and 7 are adjusted to an angle of convergence θ, and is focused on the object OB. When a base length d between the zoom lenses PL is adjusted to the human pupil distance, which ranges from 56 to 70 mm (63 mm in the average Japanese), it is possible to take a natural three-dimensional image.

In the example illustrated in FIGS. 3A and 3B, use of the zoom lens PL of FIGS. 1 and 2 is assumed. Thus, upon zooming from the wide-angle end W to the telephoto end T, the entrance pupil position 2 moves toward the object side with respect to the image pickup element 5. In view of this, the entire camera (the zoom lens PL and the image pickup element 5) is moved toward the image pickup element 5 side along the respective optical axes (i.e., in the direction opposite to the moving direction of the entrance pupil position 2) so that the entrance pupil position may not move spatially. Since the entrance pupil position is thus spatially fixed, the base length d undergoes no change upon zooming. Further, since the angle of convergence θ is adjusted by rotating the photographing systems 6 and 7 around the respective entrance pupil centers, the base length d is not changed even if the angle of convergence is changed.

Figure 4A:
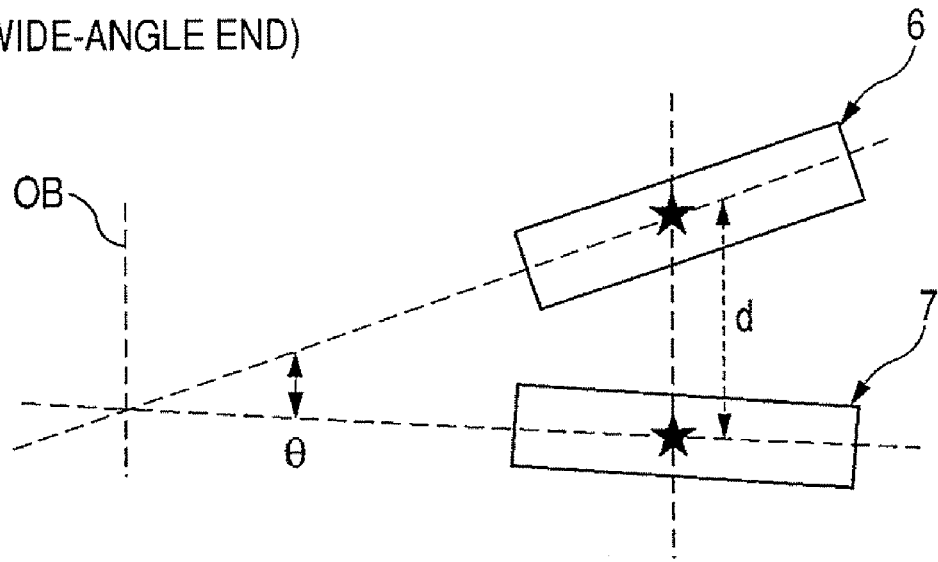
FIGS. 4A and 4B are top plan views of a camera system when photographing an object differing in position from FIGS. 3A and 3B.
Figure 4B:
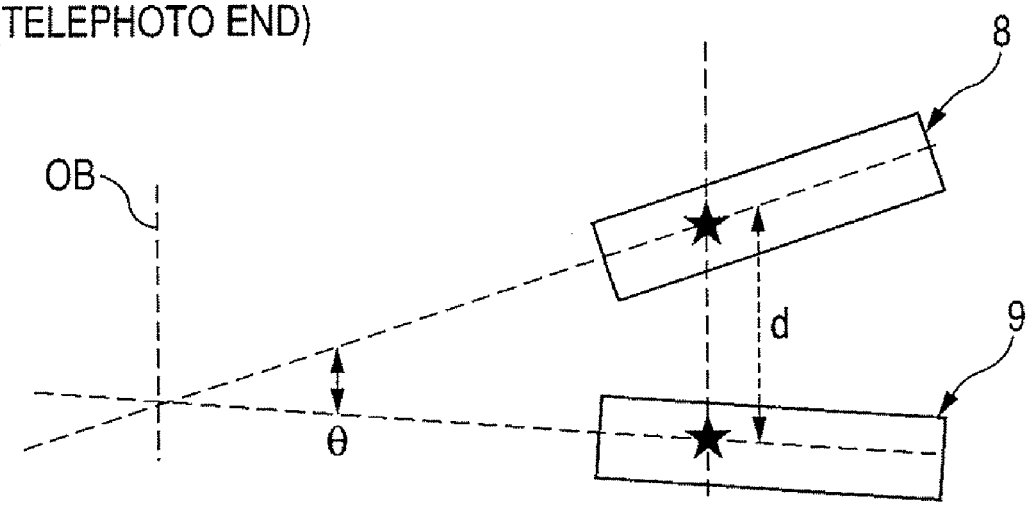

FIGS. 4A and 4B are schematic views of a camera system in which the object OB is situated further to the left as compared with the example of FIGS. 3A and 3B. FIGS. 4A and 4B illustrate the camera system with the drive mechanism 23 illustrated in FIGS. 3A and 3B omitted.

As in FIGS. 3A and 3B, in FIGS. 4A and 4B also, use of the zoom lens PL of FIGS. 1 and 2 is assumed. Thus, upon zooming from the wide-angle end W to the telephoto end T, the entrance pupil positions move toward the object with respect to the image pickup elements 5. Thus, the entire camera is moved toward the image pickup element 5 side along the respective optical axes (i.e., in the direction opposite to the moving direction of the entrance pupil positions 2) so that the entrance pupil positions may not move spatially. The angle of convergence is adjusted to θ for focusing on the object OB, which is situated on the left-hand side with respect to the centers of the two photographing systems. As in the example described with reference to FIGS. 3A and 3B, the entrance pupil positions are spatially fixed, so the base length d undergoes no change upon zooming. Further, since the angle of convergence θ is adjusted by rotating the photographing systems 6 and 7 around the respective entrance pupil centers, the base length d does not change even if the angle of convergence changes.

Zooming and the adjustment of the angle of convergence can be performed without varying the base length not only when the object is positioned horizontally but also when it is positioned vertically.

Next, an example in which variation in entrance pupil position is corrected by a mechanical cam will be described.

Figure 5A:
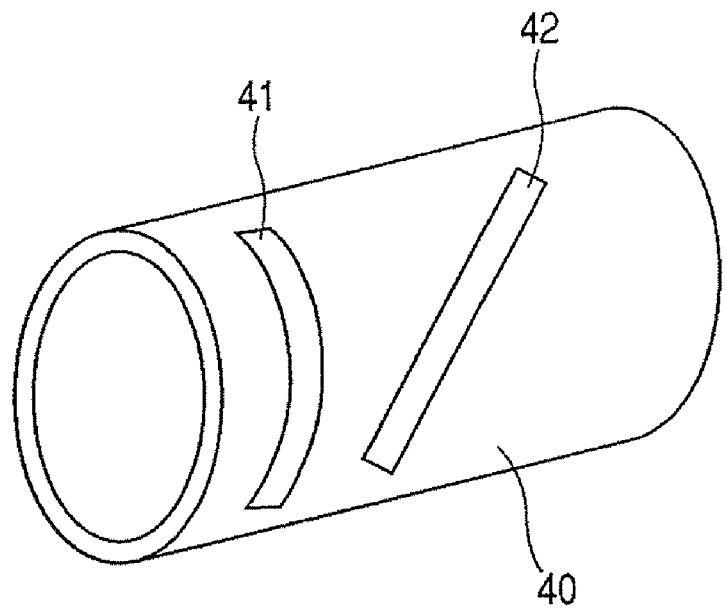
FIGS. 5A and 5B are explanatory views of a drive mechanism using a cam.
Figure 5B:
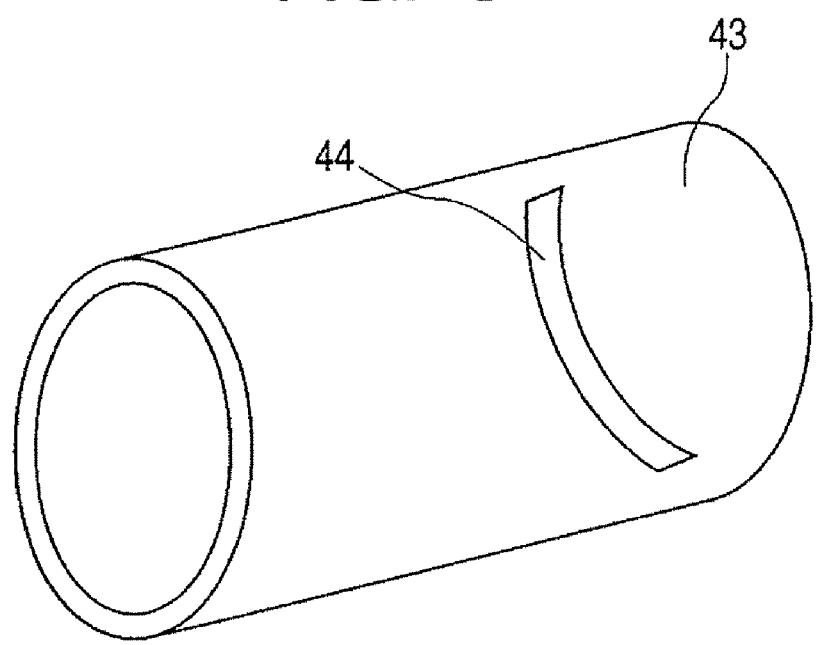

FIGS. 5A and 5B are main portion schematic views of lens barrels used in a photographing system.

FIG. 5A illustrates how a zoom cam for zooming is provided on a zoom lens barrel. In this example also, use of the above-mentioned zoom lens PL of FIGS. 1 and 2 is assumed. FIG. 5A illustrates a lens barrel 40 including a cam 41 for the first lens unit 1 and a cam 42 for the second lens unit 4. FIG. 5B illustrates a lens barrel 43 which superimposes on the outer side of the lens barrel 40. The photographing system (the zoom lens PL and image pickup element 5) is moved in the optical axis direction according to an entrance pupil variation correction cam 44 which is illustrated in FIG. 5B.

Also by using the lens barrels 40 and 43, it is possible to spatially fix the entrance pupil position of the zoom lens PL.

In the camera system of the exemplary embodiment described above, the base length of the pair of photographing systems does not change if zooming or adjustment of the angle of convergence is performed. Thus, it is possible to obtain a satisfactory parallax image for three-dimensional viewing. Further, it is possible to adopt a zoom lens other than a zoom lens in which the entrance pupil position with respect to the image pickup element varies, that is, a zoom lens other than a zoom lens in which the aperture stop is provided nearest to the object side, so it is possible to downsize the camera system.

The following are examples of the aspect of use of the camera system of this exemplary embodiment.

(1) In a three-dimensional image at a wide-angle side of a zoom lens, an object of swiftest motion vector is extracted.

(2) The angle of convergence and focusing are adjusted to the object extracted.

(3) As the velocity of the motion vector of the extracted object decreases, zooming is effected toward a telephoto side.

When applied, for example, to a monitoring camera, this control helps to obtain an enlarged three-dimensional image relatively free from object blurring whenever more detailed object information is required.

In another example, after the above-mentioned procedures (1) and (2), the following control is performed.

(4) When the movement of the object extracted remains suspended for a predetermined period of time or more, zooming is effected toward the telephoto side.

When applied to a monitoring camera or the like, this control helps to obtain a satisfactory enlarged three-dimensional image free from object blurring whenever more detailed object information is required.

In the above-mentioned procedures (3) and (4), it is also possible to perform the zooming manually instead of performing the zooming automatically.

According to the exemplary embodiment described above, it is possible to obtain a camera system suitable for three-dimensional viewing in which the optical system as a whole is small, which easily allows view angle widening, and which involves little variation in the entrance pupil position due to zooming. In particular, the variation in the entrance pupil position due to zooming is substantially eliminated, and the right and left photographing systems are rotated around the spatially fixed entrance pupil center positions to generate the angle of convergence. As a result, it is possible to maintain a fixed base length between the right and left photographing systems irrespective of the object distance and of the zoom position. Further, it is always possible to obtain a parallax image with one base length, and it is not necessary to compute a change in the parallax image, etc. upon a change in base length, so it is possible to quickly obtain an accurate parallax image. Further, when computing the object distance from the angle of convergence, it is not necessary to calculate a change in the base length, whereby it is possible to calculate the distance accurately and quickly.

While the present invention has been described with reference to exemplary embodiments, it is to be understood that the invention is not limited to the disclosed exemplary embodiments. The scope of the following claims is to be accorded the broadest interpretation so as to encompass all such modifications and equivalent structures and functions.

This application claims the benefit of Japanese Patent Application No. 2006-090807, filed Mar. 29, 2006, which is hereby incorporated by reference herein in its entirety.

What is claimed is:

1. A camera system, comprising:
  a pair of photographing systems each of which comprises:
    an image pickup element; and
    a zoom lens forming an object image on the image pickup element, in which an entrance pupil position with respect to the image pickup element moves according to zooming; and
  a drive mechanism moving the zoom lens and the image pickup element of each photographing system integrally upon zooming in a direction opposite to a direction in which the entrance pupil position of the zoom lens moves with respect to the image pickup element, wherein each of the pair of photographing systems is rotatable around an entrance pupil center of each of the zoom lenses of the photographing systems.

2. A camera system according to claim 1, wherein the drive mechanism comprises:
   a computing unit for computing the entrance pupil position, which varies according to zooming of the zoom lens, and
   an actuator for moving the zoom lens and the image pickup element integrally based on a signal from the computing unit.

3. A camera system according to claim 1, wherein the drive mechanism comprises:
   a lens barrel having a cam through which the zoom lens and the image pickup element move integrally in the direction opposite to the direction in which the entrance pupil position of the zoom lens moves with respect to the image pickup element.

* * * * *